US008779035B2

(12) United States Patent
Shah et al.

(10) Patent No.: US 8,779,035 B2
(45) Date of Patent: Jul. 15, 2014

(54) WATER BASED NON-CHROMATED PRIMERS FOR STRUCTURAL BONDING APPLICATIONS

(75) Inventors: Kunal Gaurang Shah, Abingdon, MD (US); Dalip Kumar Kohli, Churchville, MD (US)

(73) Assignee: Cytec Technology Corp., Wilmington, DE (US)

( * ) Notice: Subject to any disclaimer, the term of this patent is extended or adjusted under 35 U.S.C. 154(b) by 709 days.

(21) Appl. No.: 12/750,108

(22) Filed: Mar. 30, 2010

(65) Prior Publication Data

US 2010/0247922 A1 Sep. 30, 2010

Related U.S. Application Data

(60) Provisional application No. 61/165,209, filed on Mar. 31, 2009.

(51) Int. Cl.
| | | |
|---|---|---|
| *C09D 163/00* | (2006.01) |
| *C09D 5/08* | (2006.01) |
| *C08K 13/02* | (2006.01) |
| *C08K 5/04* | (2006.01) |
| *C08K 5/09* | (2006.01) |
| *C08K 5/16* | (2006.01) |
| *C08K 5/17* | (2006.01) |
| *C08K 5/3415* | (2006.01) |
| *C08K 5/3417* | (2006.01) |
| *C08K 5/3447* | (2006.01) |
| *C08K 5/3475* | (2006.01) |
| *C08K 5/353* | (2006.01) |
| *C08K 5/45* | (2006.01) |
| *C08K 5/46* | (2006.01) |
| *C08K 5/47* | (2006.01) |
| *C08G 59/18* | (2006.01) |
| *B32B 27/18* | (2006.01) |
| *B32B 27/38* | (2006.01) |

(52) U.S. Cl.
CPC ............. *C09D 5/082* (2013.01); *C07D 163/00* (2013.01)
USPC ........... 523/461; 523/453; 523/455; 523/456; 523/457; 523/466; 523/402; 252/394; 252/395; 252/396

(58) Field of Classification Search
USPC .......... 252/387, 388, 394, 395, 396; 428/323, 428/328, 329, 331, 402, 403, 404; 523/400, 523/402, 427, 428, 457, 458, 466, 453, 455, 523/456, 461
See application file for complete search history.

(56) References Cited

U.S. PATENT DOCUMENTS

| | | | |
|---|---|---|---|
| 2,699,409 A * | 1/1955 | Hashimoto | 428/404 |
| 3,417,064 A | 12/1968 | Bailey | |
| 4,315,839 A * | 2/1982 | Bouge et al. | 502/8 |
| 4,355,122 A | 10/1982 | Fan | |
| 4,638,038 A | 1/1987 | Salensky | |
| 4,696,763 A | 9/1987 | Bently et al. | |
| 5,576,061 A | 11/1996 | Sweet | |
| 5,869,141 A | 2/1999 | Blohowiak et al. | |
| 5,951,747 A | 9/1999 | Lewis et al. | |
| 6,110,993 A * | 8/2000 | Saito et al. | 523/211 |
| 6,369,183 B1 | 4/2002 | Cook et al. | |
| 6,475,621 B1 | 11/2002 | Kohli et al. | |
| 6,495,712 B2 | 12/2002 | Yamauchi et al. | |
| 6,887,517 B1 | 5/2005 | Cook et al. | |
| 6,933,046 B1 | 8/2005 | Cook | |
| 6,986,943 B1 | 1/2006 | Cook et al. | |
| 7,244,498 B2 | 7/2007 | Cook et al. | |
| 2003/0116269 A1* | 6/2003 | Kohli et al. | 156/307.1 |
| 2004/0104378 A1 | 6/2004 | Bhatia | |
| 2004/0170848 A1* | 9/2004 | Ludwig et al. | 428/470 |
| 2005/0176851 A1 | 8/2005 | Cook | |
| 2005/0215670 A1 | 9/2005 | Shimasaki et al. | |
| 2006/0091354 A1* | 5/2006 | van Ooij et al. | 252/70 |
| 2008/0000383 A1* | 1/2008 | Nagai et al. | 106/14.44 |

FOREIGN PATENT DOCUMENTS

| | | | | |
|---|---|---|---|---|
| EP | 0792922 A1 | 9/1997 | | |
| EP | 1524332 A1 | 4/2005 | | |
| JP | 2004-097945 | 4/2004 | | |
| JP | 2006-342419 | 12/2006 | | |
| JP | 2007-270075 | 10/2007 | | |
| WO | 9914277 | 3/1999 | | |
| WO | WO 2007008199 A1 * | 1/2007 | | C09D 5/08 |
| WO | 2007032923 | 3/2007 | | |
| WO | WO 2007104457 A1 * | 9/2007 | | C09C 1/30 |
| WO | 2008140648 | 11/2008 | | |
| WO | 2009036790 A1 | 3/2009 | | |

OTHER PUBLICATIONS

ISR/Written Opinion for PCT/US2010/029146 mailed Aug. 6, 2010.
Kazuaki Ishihara et al., "Bulky Diarylammonium Arenesulfonates as Selective Esterification Catalysts," Journal of American Chemical Society, 2005, 127, pp. 4168-4169.

* cited by examiner

*Primary Examiner* — Michael J Feely
(74) *Attorney, Agent, or Firm* — Thi D. Dang

(57) ABSTRACT

Non-chromated corrosion inhibiting primer formulations having one or more active corrosion inhibitors covalently anchored, or optionally covalently anchored, onto an organic and/or inorganic reactive specie are provided herein.

8 Claims, 4 Drawing Sheets

A

B

A
B

A

B

A

B

C

D

WATER BASED NON-CHROMATED PRIMERS FOR STRUCTURAL BONDING APPLICATIONS

RELATED APPLICATIONS

This application claims benefit of priority of U.S. Provisional Application No. 61/165,209, filed Mar. 31, 2009 the content of which is incorporated herein by reference in its entirety.

BACKGROUND OF THE INVENTION

1. Field of the Invention

Embodiments of the present invention pertain to non-chromated corrosion inhibiting primer formulations, which are useful for structural bonding applications. More particularly, non-chromated corrosion inhibiting primer formulations are provided, which include a releasable organic and/or inorganic corrosion inhibitor.

2. Description of the Related Art

Corrosion of bonded metal parts is a major concern in the aerospace and other high performance industries. Historically chromated primers have been used to protect metals from corrosion. However, due to new REACH and OSHA regulations, the use of chromates will be restricted by 2010 in the aerospace industry, among others.

The corrosion protection mechanism for chromates is well documented in literature. U.S. Pat. No. 5,951,747 reports that chromates perform the following four functions to have excellent corrosion protection on various metal alloys:

a) Releases easily from the polymer matrix to the corrosion site;
b) The chromate ion adsorbs readily on to bare metal. This alters the space charge distribution at the metal-primer interface, lowering the isoelectric point of the protective metal oxide layer, which naturally forms on active metal. This repels the corrosive ions and shifts the corrosion potential of the metal to more noble state;
c) It forms adherent chromium oxide layer at cathodic sites and blocks further corrosion reaction; and
d) It helps to neutralize the increasing acidity at the metal-electrolyte interface thus lowering corrosion. Increasing the acidity accelerates corrosion exponentially.

Several non-chromated corrosion inhibitors such as zinc phosphosilicates, molybdenum zinc phosphate, calcium borosilicate, sodium vanadate, strontium phosphate etc. have been under evaluation. Most of these inhibitors are passive (cannot leach-like chromates) and provide corrosion protection by sacrificial oxidation method.

Conventional organic corrosion inhibitors are discussed in Kuznetsov Y. L, et al., "Organic Inhibitors of Corrosion of Metals," Pleumb Pub Corp., 1996. U.S. Pat. No. 6,933,046 reports that a mechanism through which organic species prevent corrosion is by reacting with the metal substrate, the oxide film or the corrosion products to form an adherent film to prevent further corrosion. It also reports that highly effective corrosion inhibitors interact with metal by chemical adsorption.

A major drawback of these organic corrosion inhibitors relates to the interaction of the functional groups used to form strong adherent bonds on a metal substrate with the primer formulation. Due to this interaction, the shelf life and cure kinetics of the primer may be affected, which limits corrosion inhibitor transport within a coating to the corrosion site. Another drawback with many organic corrosion inhibitors is their unpredictable corrosion performance when used with epoxy based corrosion inhibiting primer formulations in preventing corrosion on highly corrosive material such as Al-2024.

Thus, non-chromated corrosion inhibitors that perform similarly to chromate primers for structural bonding applications in high performance industries such as aerospace require further improvement. Identification of organic corrosion inhibitors for use in primer formulations having a sufficient shelf life and suitable cure kinetics, while maintaining corrosion and inhibitor transport within a coating to the corrosion site would be a useful advance in the art.

SUMMARY

It has now been discovered that certain organic and/or inorganic compounds are useful as active corrosion inhibitors for use in water-based non-chromated corrosion inhibiting primer formulations in structural bonding applications.

In one aspect, the invention provides a non-chromated corrosion inhibiting primer formulation having an epoxy resin; a curing agent comprising a cure temperature greater than 300° F.; an organosilane comprising a hydrolysable group; and a corrosion inhibiting material comprising one or more active corrosion inhibitors chosen from:

a) an amino benzothiazole-based compound having the formula:

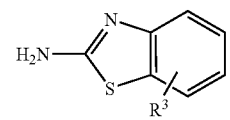

wherein $R^3$ is chosen from H, $C_nH_{2n+1}$ and $OC_nH_{2n+1}$;

b) an inorganic compound comprising an ion chosen from: $NaVO_3$, molybdate, cerium, and combinations thereof;

c) a benzotriazole-based compound having the formula

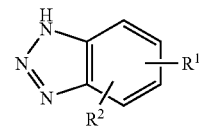

wherein $R^1$ is chosen from H, $C_nH_{2n+1}$, COOH, and OH;

wherein $R^2$ is chosen from H and $C_nH_{2n+1}$;

(d) a phenylmaleimide-based compound having the formula:

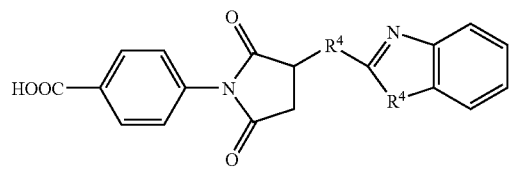

wherein each $R^4$ is independently chosen from: S, NH, and O; and (e) a mercaptobenzoimidazole-based compound having the formula:

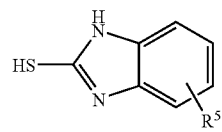

wherein $R^5$ is chosen from: H, $C_nH_{2n+1}$, COOH, and OH; and wherein n is an integer; and wherein the corrosion inhibitor is covalently anchored onto an organic or inorganic reactive species when chosen from (a), (c), (d) or (e); and wherein the corrosion inhibitor is optionally covalently anchored onto an organic or inorganic reactive species when chosen from (b).

In another aspect, the invention provides a non-chromated corrosion inhibiting primer formulation having an epoxy resin; a curing agent; an organosilane comprising a hydrolysable group; and a corrosion inhibiting material comprising a first and a second active corrosion inhibitor chosen from:

a) an amino benzothiazole-based compound having the formula:

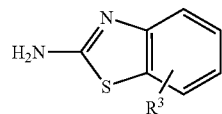

wherein $R^3$ is chosen from H, $C_nH_{2n+1}$; and $OC_nH_{2n+1}$;

b) an inorganic compound comprising an ion chosen from $NaVO_3$, molybdate, cerium, and combinations thereof;

c) a benzotriazole-based compound having the formula:

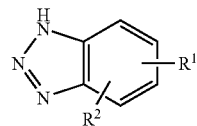

wherein $R^1$ is chosen from: H, $C_nH_{2n+1}$, COOH, and OH;

wherein $R^2$ is chosen from H and $C_nH_{2n+1}$;

(d) a phenylmaleimide-based compound having the formula:

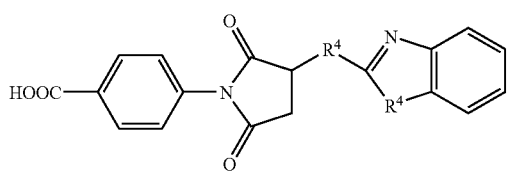

wherein each $R^4$ is independently chosen from: S, NH, and O; and (e) a mercaptobenzoimidazole-based compound having the formula:

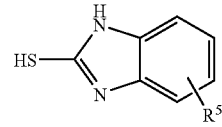

wherein $R^5$ is chosen from: H, $C_nH_{2n+1}$, COOH, and OH; and wherein n is an integer; and wherein the corrosion inhibitor is covalently anchored onto an organic or inorganic reactive species when chosen from (a), (c), (d) or (e); and wherein the corrosion inhibitor is optionally covalently anchored onto an organic or inorganic reactive species when chosen from (b).

In another aspect, the invention provides a structure including a non-chromated corrosion inhibiting primer formulation as described herein adhered to an optionally treated metal substrate.

These and other objects, features and advantages of this invention will become apparent from the following detailed description of the various aspects of the invention taken in conjunction with the accompanying Examples.

DETAILED DESCRIPTION

Figure 1:
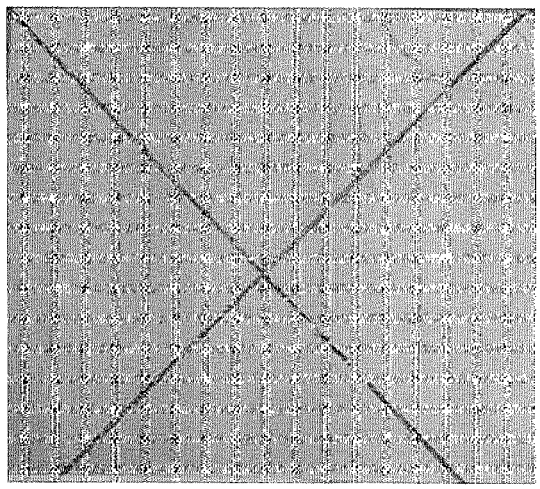
FIG. 1 illustrates the corrosion performance according to a 2000 hrs. scribe corrosion test (per ASTM B117). (A) Non-chromated ("NC") primer with active corrosion inhibitors; (B) Water-based chromated primer.
Figure 1:
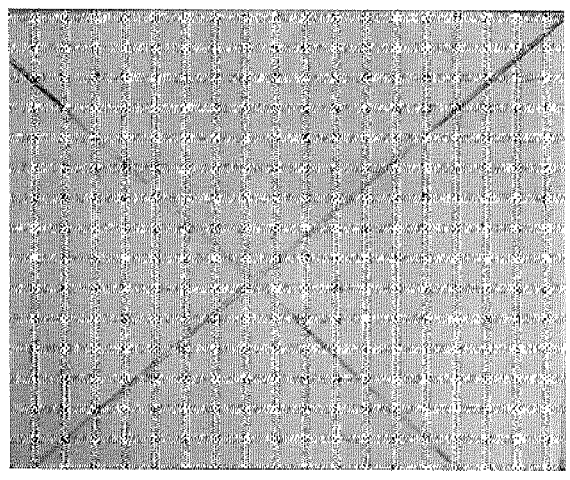
Figure 2:
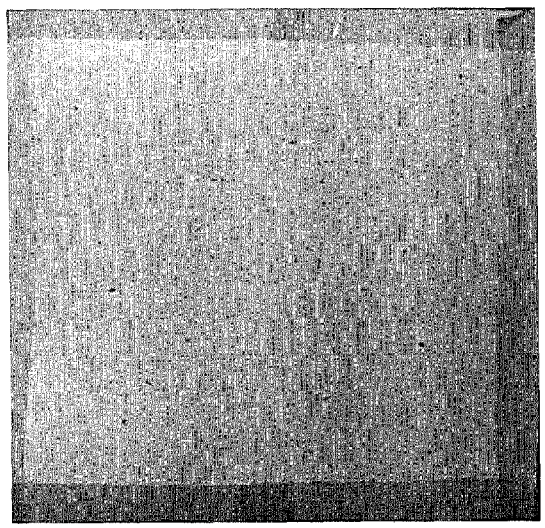
FIG. 2 illustrates a comparison of chromated vs. non-chromated primer (with passive corrosion inhibitors) on FPL surface treatment after salt fog exposure. (A) NC primer with passive corrosion inhibitors; (B) Water-based chromated primer.
Figure 2:
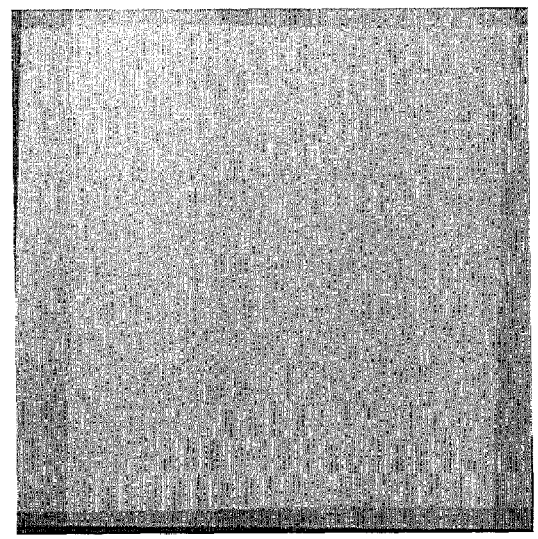

As summarized above, the present invention is based at least in part on the use of organic and/or inorganic corrosion inhibitors for use as part of a water-based non-chromated primer formulation for structural bonding applications, which addresses the need for major aerospace OEMs due to new OSHA and REACH regulations that limit the use of chromates.

The non-chromate corrosion inhibitors present in primer formulations according to the invention possess a corrosion performance comparable to chromates for highly corrosive substrates, such as Al-2024. The type of corrosion inhibitor(s), the combination of corrosion inhibitors, the amount of corrosion inhibitors in the primer's formulation, the type of curing agents used in the primer formulation and the pH of the primer formulation as described herein are factors that have been found to affect corrosion performance such that corrosion performance comparable to chromates may be achieved.

In a first aspect, the invention provides a non-chromated corrosion inhibiting primer formulation having an epoxy resin; a curing agent comprising a cure temperature greater than 300° F.; an organosilane comprising a hydrolysable group; and a corrosion inhibiting material comprising one or more active corrosion inhibitors chosen from:
  a) an amino benzothiazole-based compound having the formula:

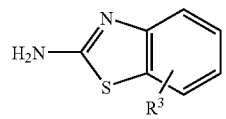

wherein $R^3$ is chosen from H, $C_nH_{2n+1}$ and $OC_nH_{2n+1}$;
  b) an inorganic compound comprising an ion chosen from: $NaVO_3$, molybdate, cerium, and combinations thereof;
  c) a benzotriazole-based compound having the formula

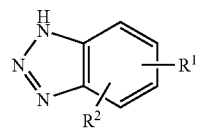

wherein $R^1$ is chosen from H, $C_nH_{2n+1}$, COOH, and OH;
wherein $R^2$ is chosen from H and $C_nH_{2n+1}$;
  (d) a phenylmaleimide-based compound having the formula:

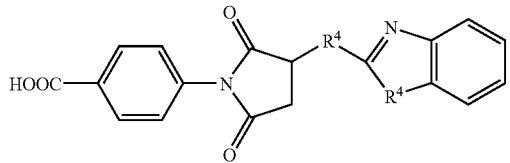

wherein each $R^4$ is independently chosen from: S, NH, and O; and
  (e) a mercaptobenzoimidazole-based compound having the formula:

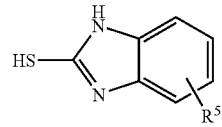

wherein $R^5$ is chosen from: H, $C_nH_{2n+1}$, COOH, and OH; and
wherein n is an integer; and
wherein the corrosion inhibitor is covalently anchored onto an organic or inorganic reactive species when chosen from (a), (c), (d) or (e); and wherein the corrosion inhibitor is optionally covalently anchored onto an organic or inorganic reactive species when chosen from (b).

In another aspect, the invention provides a non-chromated corrosion inhibiting primer formulation having an epoxy resin; a curing agent; an organosilane comprising a hydrolysable group; and a corrosion inhibiting material comprising a first and a second active corrosion inhibitor chosen from:
  a) an amino benzothiazole-based compound having the formula:

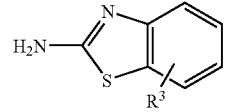

wherein $R^3$ is chosen from H, $C_nH_{2n+1}$; and $OC_nH_{2n+1}$;
  b) an inorganic compound comprising an ion chosen from $NaVO_3$, molybdate, cerium, and combinations thereof;
  c) a benzotriazole-based compound having the formula:

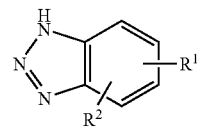

wherein $R^1$ is chosen from: H, $C_nH_{2n+1}$, COOH, and OH;
wherein $R^2$ is chosen from H and $C_nH_{2n+1}$;
  (d) a phenylmaleimide-based compound having the formula:

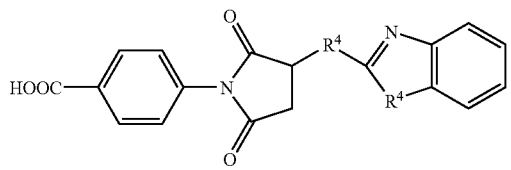

wherein each $R^4$ is independently chosen from: S, NH, and O; and
  (e) a mercaptobenzoimidazole-based compound having the formula:

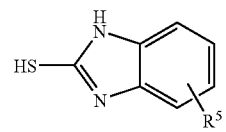

wherein $R^5$ is chosen from: H, $C_nH_{2n+1}$, COOH, and OH; and
wherein n is an integer; and
wherein the corrosion inhibitor is covalently anchored onto an organic or inorganic reactive species when chosen from (a), (c), (d) or (e); and wherein the corrosion inhibitor is optionally covalently anchored onto an organic or inorganic reactive species when chosen from (b).

In certain embodiments, n is an integer ranging from 1 to 10, and is chosen from any one of 1, 2, 3, 4, 5, 6, 7, 8, 9, and 10.

In another aspect, the invention provides a structure including a non-chromated corrosion inhibiting primer formulation as described herein adhered to an optionally treated metal substrate.

In some embodiments, the primer formulation contains a single corrosion inhibitor. In certain embodiments, the corrosion inhibitor is an amino-benzothiazole-based compound. In other embodiments, the corrosion inhibitor is a carboxybenzotriazole-based compound. In still other embodiments, the corrosion inhibitor is a phenylmaleimide-based compound.

As used herein the term "amino benzothiazole-based compound" refers to compounds having a core structure of a benzene ring fused to an amino thiazole ring, such as

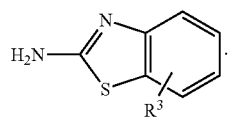

Similarly, as used herein, the term "benzotriazole-based compound" refers to compounds having a core structure of a benzene ring fused to a triazole ring, such as

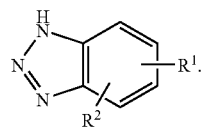

Based on the above, an example of a "carboxybenzotriazole-based compound" would therefore be a compound as depicted above with a carboxyl group as a substituent on the benzene ring.

In some embodiments, primer formulations comprising a combination of corrosion inhibitors adhered to functionalized organic or inorganic reactive species including an amino benzothiazole-based compound such as 2-amino 6-methyl-benzothiazole and a phenylmaleimide-based compound such as a thiolated 4-carboxy phenylmaleimide, will have comparable corrosion performance to chromate-containing corrosion inhibiting primer formulations when used on corrosive substrates, such as Al-2024. An example of such a primer formulation may comprise an epoxy resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent such as bis(3-aminopropyl)-piperazine ("BAPP") (available from BASF); an organosilane having a hydrolyzable group such as Z-6040 (a gamma-glycidoxypropyltrimethoxy silane available from Dow Corning, Midland, Mich.); and a corrosion inhibiting material such as one including functionalized organic and/or inorganic reactive specie based releasable corrosion inhibitor containing amino methyl benzothiazole and thiolated 4-carboxy phenylmaleimide.

In other embodiments, the combination of corrosion inhibitors and/or the amount of corrosion inhibitors present in a primer formulation affect corrosion performance and/or suitability of the primer formulation. In one embodiment, primer formulations including a combination of an amino benzothiazole-based compound such as such as a 2-amino 6-methylbenzothiazole and a carboxybenzo triazole-based compound each adhered to a functionalized organic and/or inorganic reactive specie will have comparable corrosion performance to chromate-containing corrosion inhibiting primer formulations when used on corrosive substrates, such as Al-2024. In another embodiment, the amino methyl benzothiazole-based compound component such as a 2-amino 6-methylbenzothiazole will be present in an amount of about 10% or less by weight of the primer formulation, such as about 7.5-5%, such that the amount will not cause the primer formulation to disadvantageously gel. A primer formulation as described herein may include an epoxy resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent such as BAPP (available from BASF) and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as one comprising of functionalized organic and/or inorganic reactive specie based releasable corrosion inhibitor containing amino methyl benzothiazole and carboxybenzotriazole.

In other embodiments, primer formulations including a combination of an organic and/or inorganic corrosion inhibitor, for example comprising a sodium metavanadate, and a carboxybenzotriazole-based compound adhered to a functionalized organic and/or inorganic reactive specie, will have comparable corrosion performance to chromate-containing corrosion inhibiting primer formulations when used on corrosive substrates, such as Al-2024. A primer formulation may comprise an epoxy resin such as ECN 1400 (available from Huntsman) or a combination of epoxy resins including a Novalac epoxy such as Epirez 5003 (available from Huntsman), a bis A epoxy such as XU 3903, and/or a solid bis A epoxy such as DER 669 (available from Dow); a curing agent such as BAPP and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as functionalized organic and/or inorganic reactive specie based releasable corrosion inhibitor containing a sodiumvanadate anion and carboxybenzotriazole.

In addition, the curing temperature may affect the ability of a primer formulation of the invention to achieve the similar corrosion performance of chromate-containing primer formulations when used on corrosive substrates, such as Al-2024. Thus, in some embodiments, the primer formulations can have a curing agent capable of achieving a curing temperature greater than 300° F. in combination with a corrosion inhibitor adhered to functionalized organic and/or inorganic reactive specie including a phenylmaleimide-based compound such as a thiolated 4-carboxy phenylmaleimide, which can have comparable corrosion performance to chromate-containing corrosion inhibiting primer formulations. A primer formulation may include an epoxy resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow) a curing agent that cures at 300° F. or greater such as BAPP (available from BASF); an organosilane having a hydrolyzable group such as Z-6040 (a gamma-glycidoxypropyltrimethoxy silane from Dow Corning, Midland, Mich.); and a corrosion inhibiting material such as a functionalized organic and/or inorganic reactive specie based releasable corrosion inhibitor containing thiolated 4-carboxy phenylmaleimide.

Further embodiments of primer formulations including a curing agent capable of achieving a curing temperature greater than 300° F. may include a corrosion inhibitor adhered to a functionalized organic and/or inorganic reactive specie comprising a carboxybenzotriazole-based compound having comparable corrosion performance to chromate-containing corrosion inhibiting primer formulations. A primer formulation may include, for example, a resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent that cures at 300° F. or greater such as BAPP and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as a functionalized organic and/or inorganic reactive specie based releasable corrosion inhibitor containing carboxybenzotriazole.

In another embodiment wherein the type and/or amount of the corrosion inhibitor plays a role in corrosion performance, a primer formulation may include a corrosion inhibitor adhered to a functionalized organic and/or inorganic reactive specie including a benzotriazole-based compound such as a carboxybenzotriazole in a sufficient concentration to achieve at least 90% cohesive failure, which can have comparable corrosion performance to chromate-containing corrosion inhibiting primer formulations. A primer formulation may comprise a resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent such as BAPP and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as a functionalized organic and/or inorganic reactive specie based releasable corrosion inhibitor containing carboxybenzotriazole.

In other embodiments, the pH of a primer formulation may affect the ability of a primer formulation to achieve the corrosion performance of chromate-containing primer formulations when used on corrosive substrates, such as Al-2024. However, simply maintaining the primer formulation at a suitable pH, for example a neutral pH, by using a buffer, for example, will not necessarily achieve the corrosion performance of chromate-containing primer formulations. In certain embodiments, some primer formulations including a particular combination of curing agents that is capable of maintaining a suitable neutral pH of about 6-8, such as BAPP and/or Toluene-2,4-bis(N,N'-dimethyl urea), achieves the corrosion performance of chromate-containing primer formulations. In other embodiments, some primer formulations including a functionalized organic and/or inorganic reactive specie as a carrier is capable of maintaining a suitable pH, and achieves the corrosion performance of chromate-containing primer formulations. A primer formulation may include an epoxy resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent such as BAPP and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as a functionalized organic and/or inorganic reactive specie based releasable corrosion inhibitor containing carboxybenzotriazole and sodium metavanadate.

In other embodiments, the type of corrosion inhibitor may affect the ability of a primer formulation to achieve the corrosion performance of chromate-containing primer formulations when used on corrosive substrates, such as Al-2024. In one embodiment, a primer formulation including a corrosion inhibitor adhered to a functionalized organic and/or inorganic reactive specie comprising a mercaptobenzoimidazole-based compound such as mercaptobenzoimidazole will have comparable corrosion performance to chromate-containing corrosion inhibiting primer formulations. A primer formulation may comprise resin such as ECN 1400 (available from Huntsman) or a combination of epoxy resins including a Novalac epoxy such as Epirez 5003 (available from Huntsman), a bis A epoxy such as XU 3903 (available from Resolution Performance products), and/or a solid bis A epoxy such as DER 669 (available from Dow); a curing agent that cures at 300° F. or greater such as BAPP (available from BASF) and/or Toluene-2,4-bis(N,N'-dimethyl urea); an organosilane having a hydrolyzable group such as Z-6040 (a gamma-glycidoxypropyltrimethoxy silane from Dow Corning, Midland, Mich.); and a corrosion inhibiting material such as a functionalized inorganic or organic reactive specie based releasable corrosion inhibitor containing carboxybenzotriazole.

Low volatile organic compound (low VOC) versions of the primer formulations described herein are also contemplated. Generally, primer formulations having a low VOC have 250 g or less of VOC per liter of primer formulation. In certain embodiments the primer formulations according to the present invention will contain 0 grams of VOC per liter of formulation.

These embodiments are described herein in greater detail and are illustrated in the Examples.

The term "chromate" as used herein has its ordinary meaning as known to those skilled in the art and includes chromate corrosion inhibitors such as strontium chromate, barium chromate, zinc chromate, or calcium chromate. Chromated corrosion inhibitors release hexavalent chromium ($Cr^{6+}$), a human carcinogen, and should be avoided.

The term "primer" as used herein has its ordinary meaning as known to those skilled in the art and includes a composition that provides sufficient adhesion between a metal substrate and a structural adhesive. It also stabilizes the metal oxide layer on the metal substrate and protects metals from corrosion caused, for example, by hot and/or moist and salt fog (according to ASTM B117) environments.

Examples of metal substrates that are suitable for use with non-chromated corrosion inhibiting primer formulations described herein include titanium alloys, aluminum alloys, such as Al-2024, Al-6061, Al-7075, or aluminum-lithium alloys. The corrosion inhibiting primer formulations of the examples are tested using Al-2024, which is one of the most corrosive materials. Thus, if a corrosion inhibiting primer formulation is effective for preventing corrosion of Al-2024, it will be also be effective for less corrosive substrates.

The term "non-chromated primers" as used herein has its ordinary meaning as known to those skilled in the art and includes water-based non-chromated primers, such as BR®6700-1 or BR®6800 (available from Cytec Engineered Materials, Tempe Ariz.). Conventionally, BR®6700-1 and BR®6800 include passive (non-leachable) corrosion inhibitors, which do not obtain corrosion performance that is comparable to chromates on substrates, for example metal substrates having various surface pretreatments. Non-chromated primers generally comprise at least one thermosetting resin, at least one curing agent, and a least one an adhesion promoter. In some embodiments, conventional water based non-chromated primers, BR®6700-1 and BR®6800, have been reformulated to exclude passive (non-leachable) corrosion inhibitors and include releasable non-chromated corrosion inhibitors that results in primers that perform comparably to water- and solvent-based primers containing chromates on various substrates. These compositions may be referred to as "reformulated BR®6700-1" or "reformulated BR®6800."

The term "epoxy resin" as used herein has its ordinary meaning as known to those skilled in the art and is a thermosetting resin that includes the epoxy resins disclosed in U.S. Pat. Nos. 6,475,621 and 5,576,061, which are incorporated herein by reference.

Embodiments of epoxy resins include conventional solid epoxy resins having functionalities, of at least about 1.8, or at least about 2 functionalities and containing substantially no ionic or ester groups, as described in Epoxy Resins, Lee and Neville, McGraw-Hill, Chapters 1 to 4. In some aspects, epoxy resins are optionally chain-extended, solid glycidyl ethers of phenols, such as resorcinol and the bisphenols, e.g., bisphenol A, bisphenol F, and the like. Also suitable are the solid glycidyl derivatives of aromatic amines and aminophenols, such as N,N,N',N'-tetraglycidyl-4,4'-diaminodiphenylmethane. In other aspects, epoxy resins are solid novolac epoxy resins and solid diglycidyl ether of bisphenol A ("DGEBA") resins. In certain embodiments, the epoxy resins are in a solid form, or produce a solid composition when admixed with other epoxies. In other embodiments, epoxy resins have an epoxy equivalent weight (EEW) of about 145-5000, with an equivalent weight of about 300-750 being preferred, and an equivalent weight of 325 being most preferred. Examples include a Novalac epoxy (such as Epirez 5003 (available from Huntsman)) and a bis A epoxy (such as XU-3903), or a solid bis A epoxy (such as DER 669) (available from Dow).

More particularly, examples of suitable commercial epoxy resins are Epi-Rez® SU-8 (available from Shell Chemical Co.), a polymeric epoxy resin with an average functionality of about 8, melting point (Durran's) of 82° C., and an epoxy equivalent weight (EEW) of 215 available from Shell Chemical Co.; DER 669 (available from Dow), a high molecular weight solid epoxy resin having a Durran's softening point of 135° C. to 155° C. and an epoxy equivalent weight of 3500-5500 available from the Dow Chemical Company; Epi-Rez®, 522-C, a solid DGEBA epoxy having an epoxy equivalent weight of 550-650 and a Durran's melting point of 75° C. to 85° C., available from Shell Chemical Co.; and ECN 1273, 1280, and 1299 Novolac solid epoxy resins having epoxy functionalities from 3.8 to 5.4, epoxy equivalent weights of from 225 to 235, and melting points of from 73° C. to 99° C., available from Ciba-Geigy. These resins are generally supplied in solid form and ground to a particular particle size, or supplied as an aqueous dispersion. For example, ECN-1299 is available as an aqueous dispersion from Ciba-Geigy as ECN-1440, and Epi-Rez® 522-C is available from Shell Chemical Co. as 35201 epoxy dispersion. Epoxy resins are usually present in an amount of about 20-60% by total weight of primer formulation of the corrosion inhibiting primer formulation.

Suitable epoxy comonomer resins are disclosed in the treatise Handbook of Epoxy Resins, McGraw-Hill, Inc., 1967. Examples of such resins are the bisglycidyl ethers of the bisphenols, particularly bisphenol A, bisphenol F and bisphenol S. Also suitable are the various phenolic and cresolic novolac-type resins, as well as the venous glycidoxy amines and aminophenols, particularly N,N,N',N'-tetrakis(glycidyl)-4,4-diaminodiphenyl methane and N,N,O-tris(glycidyl)-4-aminophenol. Epoxy resins based on the glycidyl ethers of the various dihydroxy-naphthalenes and phenolated dicyclopentadienes are also suitable.

The phenolic resin can comprise novolac type phenolic resin (the so-called random novolac type phenolic resin) wherein the ratio of o-methylene to p-methylene bond is less than 1.0 and/or a resole type phenolic resin (methylol type, or dimethylene ether type). Mixtures of the ordinary novolac type phenolic resin and/or the resole type phenolic resin may also be used.

Thermoplastic phenoxy resins are suitable for use as modifiers and tougheners in the primer formulation. These are of the waterborne type, and may be prepared according to the general procedures described in U.S. Pat. Nos. 4,355,122, and 4,638,038, the disclosures of which are incorporated herein by reference.

Water soluble polyether polymers suitable for use as modifiers herein include at least one of a poly(ethylene oxide) or a poly(vinylmethylether) polymer. The poly(ethylene oxide) polymers are well known and commercially available. They are prepared by methods well known in the art and as found in, for example, U.S. Pat. No. 3,417,064.

Emulsified epoxies, may be used as coreactants or modifiers in the present invention. These emulsions may be added to the compositions of the present invention at 1% to 10% levels. Suitable emulsified epoxies are commercially available from Shell Chemical Co., Ciba-Geigy and Vianova. Some examples include ER 3510-W-60 and ER 3515-W-60 from Shell Chemical Co. or PY 323 from Ciba-Geigy.

In some embodiments, the epoxy resin dispersed phase comprises from 40 to about 10 percent by weight, and the aqueous continuous phase comprises from 60 to about 90 percent by weight, of the primers. The epoxy resin dispersed phase may comprise a dispersion of more than one epoxy resin as a mixture of distinct particles, or may consist of only one type of particle containing more than one epoxy resin. Thus, a flexibilizing epoxy such as the higher molecular weight bisphenol A or bisphenol F epoxies may be blended with a highly temperature resistant epoxy such as TGMDA and the mixture cooled, ground, or otherwise dispersed into solid particles of the requisite size. These same epoxy resins might be advantageously dispersed separately without blending.

Mixtures of epoxy resins are also suitable. In one embodiment, a mixture comprises a solid epoxy resin having a functionality of about 5.5 or less, and a solid epoxy resin having a functionality of about 6 or more. The use of higher functionality epoxy resins, i.e., epoxy resins having a functionality of five or more, in minor amounts is suitable, for examples less than 40 weight percent based on the sum of the weights of all epoxy resins in the composition. The use of such higher functionality epoxy resins in such minor amounts has been unexpectedly found to increase the solvent resistance of the cured primer without lowering adhesive properties substantially. A preferred high functionality epoxy resin is Epi-Rez®SU-8, a polymeric solid epoxy resin having an average functionality of eight. A particular embodiment includes a mixture of:

1) from 30 to 70 weight percent of a solid epoxy resin having a functionality of from about 1.8 to about 4 and an epoxy equivalent weight of from about 400 to about 800;

2) from 5 to 20 weight percent of a solid epoxy resin having a functionality of from about 1.8 to about 4 and an epoxy equivalent weight of from about 2000 to about 8000; and 3) from 10 to 40 weight percent of a solid epoxy resin having a functionality of about 5 or more and having an epoxy equivalent weight of from about 100 to about 400, the weight percents totaling 100 percent based on total weight of the epoxy mixture.

The term "organosilane having a hydrolyzable group" as used herein has its ordinary meaning as known to those skilled in the art and may comprise those organosilanes having a hydrolyzable group disclosed in U.S. Pat. No. 6,475,621, which is incorporated herein by reference.

In one embodiment, the organosilane compound used in the non-chromated corrosion inhibiting primer formulation has silane functional groups that can react or bond to the material to be bonded to a metal surface. In certain embodiments, organosilanes have the following formula:

$$R_1-\underset{\underset{X}{|}}{\overset{\overset{R_2}{|}}{Si}}-\left[O\underset{\underset{R_2}{|}}{\overset{\overset{R_2}{|}}{Si}}\right]_n-R_2$$

wherein n is greater than or equal to 0; wherein each X is OH, $OCH_3$, and $OCH_2H_5$; wherein $R_1$ is $CH=CH_2$,

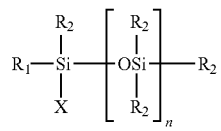

or $CH_2-CH_2-CH_2-Y$, wherein Y is $NH_2$, SH, OH, NCO, $NH-CO-NH_2$, $NH-(CH_2)_3NH_2$, NH-Aryl,

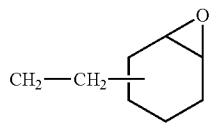

and wherein each $R_2$ is alkyl, alkoxy, aryl, substituted aryl, or $R_1$.

Examples of suitable commercial organosilane compounds available from OSi Specialties Inc., Danbury, Conn. Include, but are not limited to, A-186, a beta-(3,4-epoxycyclohexyl)ethyltrimethoxy silane; A-187, a gamma-glycidoxypropyltrimethoxysilane; A-189, a gamma-mercaptopropyltrimethoxysilane; A-1100, a gamma-aminopropyltriethoxysilane; A-1106, an aminoalkyl silicone solution; A-1170, a bis-(gamma-trimethoxy-silylpropyl) amine; Y-9669, a N-phenyl-gamma-aminopropyl-trimethoxysilane; Y-11777, an amino alkyl silicone/water solution; and Y-11870, an epoxy functional silane solution. Other suitable commercially available organosilanes include, but are not limited to, Z-6040, a gamma-glycidoxypropyltrimethoxy silane from Dow Corning, Midland, Mich. and HS2759, an aqueous epoxy functional silane; HS2775, an aqueous amino silane solution; and HS2781 an aqueous oligomeric silane solution with amino and vinyl groups all sold by Huls America Inc., Somerset, N.J. Another example is 3-glycidoxypropylmethoxysilane, which is sold under the trademark Z-6040.

Generally, the organosilanes are present in the corrosion inhibiting primer formulation of the present invention in amounts ranging from about 0.01 to 75 parts per hundred parts of the epoxy resin, preferably from about 0.01 to 30 parts per hundred parts of the epoxy resin, more preferably from about 0.01 to 10 parts per hundred parts of the epoxy resin and most preferably from about 1 to 7 parts per hundred parts of the epoxy resin.

In some embodiments, the liquid organosilanes are added directly to the aqueous primer composition. The organosilanes are then dispersed in water using conventional methods. For example, one method of dispersing the organosilanes in water comprises dripping the organosilanes into an aqueous solution of thermosetting resin under vigorous stirring. The organosilanes can also be initially dissolved or suspended in a solvent that is miscible with water. In the latter case, the organosilane solution is simply added to the water, without excessive stirring or mixing. The aqueous organosilane solution is then mixed with an aqueous thermosetting composition.

The term "epoxy curing agent" as used herein has its ordinary meaning as known to those skilled in the art and includes substantially water insoluble curing agents that are solid at room temperature. Examples of such curing agents are aromatic amine curing agents such as 4,4'-diaminodiphenylmethane, 2,2-bis(4-[4-aminophenoxy]phenyl)propane and 3,3'- and 4,4'-diaminodiphenylsulfone. Further suitable curing agents are 3,3'- and 4,4'-diaminodiphenyloxide, 3,3- and 4,4'-diaminodiphenyloxide, 3,3'- and 4,4'-diaminodiphenylsulfide, and 3,3'- and 4,4'-diaminodiphenylketone. In some embodiments, the curing agent is 4,4'-[1,4-phenylene(1-methylethylidene)]-bis(benzeneamine). Also suitable are the amino and hydroxyl terminated polyarylene oligomers wherein the repeating phenyl groups are separated by ether, sulfide, carbonyl, sulfone, carbonate, or like groups. Examples of such curing agents are the amino- and hydroxyl-terminated polyarylenesulfones, polyaryleneethersulfones, polyetherketones, polyetheretherketones, and like variants.

Also suitable are the amino and hydroxyl terminated polyarylene oligomers wherein the repeating phenyl groups are separated by ether, sulfide, carbonyl, sulfone, carbonate, or like groups. Examples of such curing agents are the amino- and hydroxylterminated polyarylenesulfones, polyaryleneethersulfones, polyetherketones, polyetheretherketones, and like variants. The curing agents are usually present in amounts from about 2 to about 30 parts per hundred of said thermosetting resin.

Other embodiments of "epoxy curing agents" include a substituted amino triazine such as 2-β-(2'-methylimidazolyl-1'1-ethyl-4,5-diamino-s-triazine, which is sold under the trademark CUREZOL 2-Mz-Azine®; a modified polyamine sold under the trademark Ancamine 2014®; dicyanadiamide (DICY), or a water insoluble curing agent such as a bis-urea based curing agent (such as Omicure 24) or Toluene-2,4-bis (N,N'-dimethyl urea) (such as Omicure U-24 from CVC chemicals); imidazoles; amine-epoxy adducts and/or an aromatic amine such as bis(3-aminopropyl)-piperazine (BAPP) (available from BASF).

Other suitable solid diamine curing agents for use with the non-chromated corrosion inhibiting primer formulations of the present invention include 2,4-toluenediamine, 1,4-phenylenediamine, 2,2-bis(4-aminophenyl)hexafluoro propane, 2,2-bis(3-amino-4-hydroxyphenyl)hexafluoro propane, 3,4'-diaminodiphenyloxide, 9,9-bis(4-aminophenyl)fluorene, o-toluidine sulfone, and 4,4'-diaminobenzanilide. Particularly preferred are 9,10-bis(4-aminophenyl)anthracene, 2,2-bis(4-[3-aminophenoxy]phenyl)sulfone, 2,2-bis(4-[4-aminophenoxy]phenyl)sulfone, 1,4-bis(4-aminophenoxy) biphenyl, bis(4-[4-aminophenoxy)phenyl)ether, and 2,2-bis ([4-(4-amino-2-trifluorophenoxy)]phenyl) hexafluoropropane. Also included is XU 95101a curing agent commercially available from Ciba-Geigy. One embodiment of a curing agent is 4,4'-[1,4-phenylene(1-methylethylidene)]-bis(benzeneamine).

In some embodiments, solid amine curing agents having melting points below 240° C., or below 175° C. are utilized. In other embodiments, those solid amine curing agents having melting points below 300° F., or below 220° F. are utilized. When curing agents below 300° F. are used, at least two corrosion inhibitors are required in the primer formulations described herein. In other embodiments, curing agents have a curing temperature of 300° F. or greater, for example, from 300-400° F., 325-375° F., or for example about 350° F., such as BAPP (available from BASF), are used. When curing agents having a cure temperature of 300° F. or greater are used only one corrosion inhibitor is required in the primer formulations described herein, although more than one corrosion inhibitor can be used.

Curing agents may be used in amounts of about 1-10%, such as about 2-5% total weight of the primer formulation.

BR®6700 comprises Epirez 5003, XU-3903, DER 669 (available from Dow), 2MZ amine, Ancamine 2014, DICY, and 3-glycidoxypropylmethoxysilane. As used herein, such as in the Examples, BR®6700 in most cases refers to a reformulated version of the commercial product wherein the typical passive corrosion inhibitors found in the formulation is replaced with the corrosion inhibitors described herein.

BR®6700-1 comprises Epirez 5003, XU-3903, DER 669 (available from Dow), BAPP, toluene-2,4-bis(N,N'-dimethylurea, Mergal K10N (a preservative), and 3-glycidoxypropylmethoxysilane (Z-6040) (available from Dow Corning, Midland, Mich.). As used herein, such as in the Examples, BR®6700-1 in most cases refers to a reformulated version of the commercial product wherein the typical passive corrosion inhibitors found in the formulation are replaced with the corrosion inhibitors described herein.

BR®6800 comprises ECN 1400 (available from Huntsman), BAPP, Mergal K10N, and 3-glycidoxypropylmethoxysilane (Z-6040). As used herein, such as in the Examples, BR®6800 in most cases refers to a reformulated version of the commercial product wherein the typical passive corrosion inhibitors found in the formulation are replaced with the corrosion inhibitors described herein.

The term "passive corrosion inhibitor" as used herein has its ordinary meaning as known to those skilled in the art. Passive corrosion inhibitors do not leach like chromates and provide protection by sacrificial methods. Some passive corrosion inhibitors include zinc phosphosilicates, strontium zinc phosphosilicate, strontium phosphosilicate, molybdenum zinc phosphate, zinc phosphate, calcium borosilicate and strontium phosphate. In some embodiments, the primer formulation does not include passive corrosion inhibitors.

The term "active corrosion inhibitor" as used herein has its ordinary meaning as known to those skilled in the art. Active corrosion inhibitors are those that are released in response to a corrosion event, e.g., with a change of pH. Once released, the active corrosion inhibitors leach to the corrosion site and prevent corrosion of the substrate.

The term "organic corrosion inhibitor" as used herein has its ordinary meaning as known to those skilled in the art. In some embodiments, organic corrosion inhibitors contain functional groups that are used to form strong adherent bonds on a metal substrate but do not interact with the non-chromate primer. In other embodiments, the corrosion inhibitor only substantially releases in the event of corrosion. In yet other embodiments, the organic corrosion inhibitor displaces water from a metal surface thereby forming an adherent film. In some embodiments, the organic corrosion inhibitor is soluble over a wide range of pH and is capable of leeching to the corrosion site. In other embodiments, the corrosion inhibitors are chemically anchored to the surface of a particle having an aluminum oxyhydroxide surface through a carboxylate bond.

Organic corrosion inhibitors are generally low to moderate molecular weight molecules that primarily prevent corrosion by either reacting with the surface of the metal, its oxide, or its corrosion products to form a thin film. (Kuznetsov, Y. I., J. G. N. Thomas and A. D. Mercer, "Organic Inhibitors of Corrosion of Metals", Plenum Pub Corp. 1996.) Highly effective organic corrosion inhibitors generally interact with the metal via chemical adsorption. Chemical adsorption involves the formation of a coordinate bond between the metal surfaces and the organic corrosion inhibitor. The nature of the metal and the structure of the organic have a decisive effect on the strength of the bond and therefore the efficiency of the organic corrosion inhibitor. Organic corrosion inhibitors generally have donor atoms such as S, O and N that can donate electrons to the metal, thereby forming the coordinate bond. All other things being equal, higher electron density and larger polarizabilities usually lead to better corrosion protection, as known in the art. Because film formation is a chemical adsorption process, the temperature and the concentration of the inhibitors are also important factors in determining the effectiveness of the organic corrosion inhibitors. Corrosion inhibitors can be added directly to the protective organic coating, and using several different corrosion inhibitors can produce a synergistic effect.

Examples of organic corrosion inhibitors useful in the compositions and methods described herein include, but are not limited to, amino methyl benzothiazole, thiolated 4-carboxy phenylmaleimide, 4-, and/or 5-carboxybenzotriazole (CBT), and mercaptobenzoimidazole (MBI).

The term "inorganic corrosion inhibitor" as used herein has its ordinary meaning as known to those skilled in the art and includes chromate-like inorganics (e.g., molybdates, vanadates, and manganates) as described in Cohen, S. M. "Replacements for Chromium Pretreatments on Aluminum," Corrosion, 51(1), 71-78, 1995. An inorganic corrosion inhibitor may contain one or more ion selected from the group consisting of $NaVO_3$, $VO_4$, $V_2O_7$, phosphate, phosphonate, molybdate, cerium, and borate. Examples of inorganic corrosion inhibitors include, but are not limited to, a metavanadate anion, such as sodium metavanadate, a combination of a molybdate and metavanadate, or any combinations of molybdate, metavanadate, phosphate, phosphonate, cerium or borate.

The term "organometallic corrosion inhibitor" as used herein has its ordinary meaning as known to those skilled in the art and includes Organophosphates such as Triphenylphosphate or triarylphosphate; Organothiols such as Triazolethiol; Organonitrates such as Methylnitrate; Sulfur heterocyclic such as 4-Methyl-2-imidazolidinethione; Sulfides such as Propargyl sulfide; or Metal-organophosphorous complexes. Organometallic corrosion inhibitors or other corrosion inhibitors may be used in primer formulations in addition to the corrosion inhibitors described herein.

As used herein, an "anchor" is a chemical bond to the surface of a functionalized organic and/or inorganic specie. As used herein the terms "particle" or "a functionalized organic and/or inorganic reactive specie" include organic and/or inorganic particles to which the organic and/or inorganic corrosion inhibitors can be attached and can be released in an event of corrosion, e.g., a change in pH. In one embodiment, the anchoring organic and/or inorganic reactive specie includes a particle having an aluminum oxyhydroxide specie. The term "aluminum oxyhydroxide" as used herein has its ordinary meaning as known to those skilled in the art and includes aluminum oxyhydroxide described in U.S. Pat. No. 6,933,046, which is incorporated by reference in its entirety. For example, aluminum oxyhydroxide includes any material having a surface that is or can be processed to form a surface or layer of boehmite, including specifically aluminum metal, aluminum nitride, aluminum oxynitride (AlON), $\alpha Al_2O_3$, $\gamma Al_2O_3$, transitional aluminas of general formula $Al_2O_3$, boehmite ($\gamma AlO(OH)$), pseudoboehmite ($\gamma AlO(OH) \cdot xH_2O$ where $0<x<1$), diaspore ($\alpha$-AlO(OH)), and the aluminum hydroxides ($Al(OH)_3$) of bayerite and gibbsite.

In one embodiment, the aluminum oxyhydroxide may include those of the general formula $\gamma AlO(OH) \cdot xH_2O$. When x=0 the material is called boehmite; when x>0 the materials incorporate water into their crystalline structure and are known as pseudoboehmite. Boehmite and pseudoboehmite are also described as $Al_2O_3 \cdot zH_2O$ where, when z=1 the material is boehmite and when $1<z<2$ the material is pseudoboehmite. The above materials are differentiated from the aluminum hydroxides (e.g., $Al(OH)_3$, bayerite and gibbsite) and diaspore ($\alpha$-AlOOH) by their compositions and crystal structures. Boehmite is usually well crystallized with a structure in accordance with the x-ray diffraction pattern given in the JCPDS-ICDD powder diffraction file 21-1307, whereas pseudoboehmite is less well crystallized and generally presents an XRD pattern with broadened peaks with lower intensities. In certain embodiments, the functionalized organic and/or inorganic particle is a clay chosen from bohemite, pseudobohemite, laponite, montmorrillonite, and combinations thereof.

"Surface" does not necessarily indicate that a uniform layer of material is present. For example, there may be portions with no material, or the surface may be unevenly thick. When a corrosion inhibitor is "anchored", "grafted", "attached" or "chemically anchored" by a chemical bond on a functionalized organic and/or inorganic reactive specie, there may be one or more intermediate groups between the corrosion inhibitor and the chemical bond, or the corrosion inhibitor may be directly chemically grafted (i.e., one bond) to the anchored functional group. The intermediate groups may be bifunctional, i.e., contain a different reactive group on each end, or may be difunctional, i.e., contain the same reactive group on each end. A "corrosion inhibitor" as used herein refers to a compound having a structure that includes at least one portion thereof that reduces at least one effect of corrosion.

In one embodiment, a corrosion inhibitor can be chemically anchored directly to the functionalized organic and/or inorganic reactive specie via a functional group. In one embodiment, the corrosion inhibitor contains at least one acid group that is used to chemically anchor the corrosion inhibitor to the surface of the functionalized specie/particle. Exemplary acid groups include acrylic acid groups, fumaric acid groups, oxalic acid groups, or carboxylic acid groups. In some embodiments, all of the acid groups are carboxylic acid groups. The acid group, such as the carboxylic acid group, may be the primary functional group of the corrosion inhibitor that chemically adsorbs to the metal surface to arrest corrosion, or the anchored molecule or acid group such as the carboxylic acid group may also contain additional functional groups that inhibit corrosion.

In another embodiment, the corrosion inhibitor can be chemically grafted to the functionalized organic and/or inorganic reactive specie through reactions that graft the corrosion inhibitor to carboxylates that have previously been chemically anchored to the surface of the functionalized organic and/or inorganic reactive specie. In yet another embodiment, the corrosion inhibitors can be chemically grafted to the functionalized organic and/or inorganic reactive specie by a series of reactions. The series of reactions may comprise separate sequential reactions with recovery of intermediates, or a series of reactions in a single pot where only the final product is recovered.

The purpose of the described chemical surface anchoring methods is to allow anchoring of different corrosion inhibitors to the surface of various functionalized organic and/or inorganic reactive species or to anchor both corrosion inhibitors and non-corrosion inhibitors such as compatibilizing agents to the specie's surfaces. Typically there is one corrosion inhibitor per organic or inorganic reactive specie, though different corrosion inhibitors and reactive species can be used in the primer formulations described herein. The resulting surface modified functionalized organic and/or inorganic reactive species are then incorporated into a protective coating applied to a substrate such as a metal surface. The anchored corrosion inhibitors are released from the functionalized organic and/or inorganic reactive specie by the strongly basic conditions that are encountered following the onset of corrosion of metals such as aluminum and iron.

Useful concentrations of the functionalized organic and/or inorganic species/particles in the formulations include a range that is between 0.5 and 0.05 corrosion inhibitors per number of surface reactive groups in organic and/or inorganic functionalized specie. The useful concentration range for the chemically anchored corrosion inhibitors is 2:1 (functional group:corrosion inhibitor), to 100:1 (functional group:corrosion inhibitor).

In certain embodiments the organic and/or inorganic corrosion inhibitor may be carried on a nanoparticle or a nanostructure. The term "nanoparticle" as used herein has its ordinary meaning as known to those skilled in the art and includes a particle of about 100 nanometers (nm) in diameter or less. The term "nanostructure" as used herein has its ordinary meaning as known to those skilled in the art and includes a scaffold or cage having pores for accepting corrosion inhibitors. The release of corrosion inhibitors may be controlled by changing the pore size or the hydrophobicity of the cage structure. In one embodiment, the nanoparticles have various particle size distributions as known in the art. In certain embodiments, the nanoparticles or nanostructures are formed by reacting the nanoparticles or nanostructures of functionalized organic and/or inorganic reactive particle with an organic and/or inorganic corrosion inhibitor using an acidic group such as acrylic acid, fumaric acid, oxalic acid, or lysine. The release of corrosion inhibitors from the nanoparticle or nanostructure can be controlled by changing the pH. In some embodiments, the nanoparticles are capable of maintaining a pH of about 7.

In some aspects, the corrosion inhibitor is a benzotriazole-based compound such as

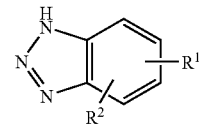

wherein $R^1$ is H, $C_nH_{2n+1}$, COOH, or OH
wherein $R^2$ is H or $C_cH_{2n+1}$; and
wherein n is an integer such as 1-10.
Examples of $C_1H_{2n+1}$ include, but are not limited to, $CH_3$, $C_2H_5$ or $C_3H_7$ and the like.

In one embodiment the benzotriazole compound is a carboxybenzotriazole having the following formula:

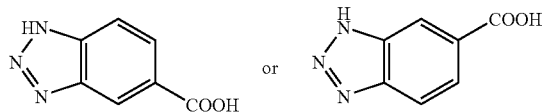 [SMILES: O=C(O)c1ccc2[nH]nnc2c1 ; "or" ; O=C(O)c1ccc2nn[nH]c2c1]

Another example of a corrosion inhibitor is an aminobenzothiazole-based compound of formula

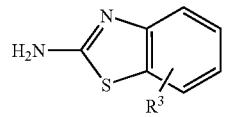

wherein $R^3$ is H, $C_nH_{2n+1}$ or $OC_nH_{2n+1}$; and
wherein n is an integer such as 1-10.

Examples of $C_nH_{2n+1}$ include, but are not limited to, $CH_3$, $C_2H_5$ or $C_3H_7$ and the like. Examples of $OC_nH_{2n+1}$ include, but are not limited to, $OCH_3$, $OC_2H_5$ or $OC_3H_7$ and the like.

In one embodiment, the aminobenzothiazole-based compound is a 2-amino-6-methylbenzothiazole having the following formula:

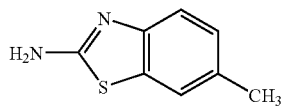

Another example of a corrosion inhibitor is a phenylmaleimide-based compound such as

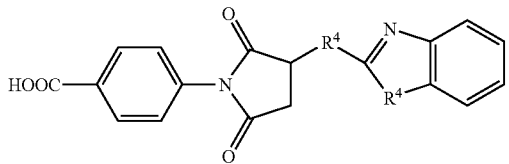

wherein $R^4$ is independently S, NH or O. In one embodiment, each $R^4$ is S, and therefore may be referred to as a thiolated phenylmaleimide.

The term "corrosion performance" as used herein has its ordinary meaning as known to those skilled in the art and measures the degree of corroded metal after environmental exposure, for example, using image performing software. ASTM B117 is a specification for salt fog exposure, that is, the conditions under which the specimen must be exposed to measure corrosion performance. Specimens exposed under ASTM B117 salt fog may be used to measure corrosion by observation or by using image profiling software that will quantify area that has corrosion based on a picture of the sample. For example, corrosion performance may be measured as percent corrosion after 42 days of salt fog exposure. Corrosion performance that is comparable to chromate means approximately at least 90%, such as at least 95% or 97%, of the specimen is not corroded after exposure. Thus, corrosion performance that is comparable to chromate can mean about less than 10% corrosion, and in other embodiments 5%, 4%, 3%, 2% or less corrosion such as 1%-2%. The specimens may be made using ASTM D1002, a specification for making the samples for performing the corrosion performance testing. ASTM D1002 measures corrosion performance and specifically is a lap shear joint test and measures shear strength of the adhesive joint.

In other embodiments, organic corrosion inhibitors have one or more of the following attributes for corrosion protection in structural bonding water based primer:
(a) the organic species does not interfere with the primer formulation;
(b) the corrosion inhibitor only releases in event of corrosion;
(c) the corrosion inhibitor displaces water from a metal surface and form an adherent film; and
(d) the corrosion inhibitor maintains solubility over wide range of pH and thus can leach to the corrosion site.

U.S. Pat. No. 6,933,046, which is incorporated herein reference, relates to releasable non-chromated corrosion inhibitors. However, not all corrosion inhibitors, such as reformulated BR®6700-1 and BR®6800, are suitable for water based non-chromated (NC) primer formulations. In some embodiments, a NC corrosion inhibitor for water-based primers is used in aerospace industry for structural bonding applications. Examples of structural bonding applications are known to those of ordinary skill in the art.

In some embodiments, the primer formulation has a neutral pH such as 6-8 or 7-8. In other embodiments, wherein the corrosion inhibiting primer formulation is used with Sol Gel treated surfaces, a suitable curing agent may be used that is capable of maintaining the corrosion inhibiting primer formulation at a neutral pH, such as 6-8 or 7-8. Without being bound by theory, it is believed that a high pH polymerizes organosilanes and also destroys Sol Gel treated surface that contains an organosilane. In other embodiments, such as those wherein the corrosion inhibiting primer formulation is used with phosphoric acid annodization (PAA) and phosphoric-sulfuric acid annodization (PSA) treated surfaces, the pH may be neutral such as a pH of 6-8 or 7-8 or higher such as a pH of 8-9. Although some formulations may work at an acidic pH, a neutral pH provides a more universally suitable primer formulation.

The term "Sol-Gel surface treatment" as used herein has its ordinary meaning as known to those skilled in the art and includes the technology described in U.S. Pat. No. 5,869,141. Sol-Gel comprises an organozirconium compound such as tetra-n-propoxy zirconium propoxy, an organosilane such as 3-glycidoxypropylmethoxysilane, and may comprise additional components such as acetic acid and water. Sol Gel surface treatments form a metal-primer interface. Surfaces receiving Sol Gel treatment include titanium alloys, aluminum alloys, such as Al-2024, Al-6061, Al-7075, or aluminum-lithium alloys. Sol Gel is based on a chemical bonding adhesion mechanism.

Surface treatment may also include chromate acid annodization (CAA), PAA or PSA, which are known in the art and are based on a mechanical interlocking adhesion mechanism. Surfaces receiving PAA or PSA treatment include aluminum alloys, such as Al-2024, Al-6061, Al-7075, or aluminum-lithium alloys.

Some embodiments result in corrosion performance in both scribe test (ten (10) weeks' exposure) and single lap shear test after 1000 hrs. of salt fog exposure that is comparable to chromated primers. In some aspects, the releasable NC corrosion inhibitors formed with nanoparticle or nanostructure carrier help to maintain a neutral pH in the primer, such as a pH of 6-8 or 7-8 making the primer formulation compatible with various surface treatments described above. In some aspects, the mechanical performance and cure kinetics of the primer is not affected by organic species present in the corrosion inhibitors.

The term "VOC" or "volatile organic compound" as used herein has its ordinary meaning as known to those skilled in the art and includes an organic chemical compound that has a high enough vapor pressure under normal conditions to significantly vaporize and enter the atmosphere.

The terms "approximately, "about," and "substantially" as used herein represent an amount close to the stated amount that still performs the desired function or achieves the desired result. For example, the terms "approximately," "about" and "substantially" may refer to an amount that is within less than 10% of, within less than 5% of, within less than 1% of, within less than 0.1% of, and within less than 0.01% of the stated amount.

The term "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60% of, greater than 70% of, greater than 80% of, greater than 90% of, greater than 95% of, greater than 99% of, and 100% of the whole.

EXAMPLES

The following examples are provided to assist one skilled in the art to further understand embodiments of the present invention. These examples are intended for illustration purposes and are not to be construed as limiting the scope of the embodiments of the present invention or the claims appended hereto.

Examples 1-3 illustrates a comparison of primer formulations containing a) corrosion inhibitors described herein, b) chromate-containing corrosion inhibitors, or c) other non-chromate containing corrosion inhibitors.

Example 1

Synthesis of Active Corrosion Inhibitors

In a 250 ml four necked polymerization kettle equipped with mechanical stirrer, condenser, dropping funnel and $N_2$ inlet and outlets, methylene diphenyl diisocyanate (250 gms) and DMF solvent are placed. Then 2-amino-6-methylbenzothiazole (328 gms) dissolved in DMF is dropped into the kettle through dropping funnel over a period of 10-15 min. The total solid content of reaction mixture is fixed to 35 wt %. The stirring reaction mixture at room temperature is continued until the NCO peak at 2270 cm-1 disappeared at the FTIR spectrum of sample taken from reaction kettle every 30 mins. The final product is placed in a Teflon mold and heated in a vacuum oven at 60'C until most of the solvent is removed. The temperature is further raised to 120° C. and maintained for 3 hrs to remove traces of solvent.

A mixture containing 55 gms of ECN 1400 (from Huntsmann), 25 gms of BAPP (from BASF), 20 gms of functionalized organic specie containing 2-amino-6-methylbenzothiazole (as prepared above), 0.1 wt % Mergal K10N (from Troy Chemicals) and 1 wt % of silane coupling agent Z-6040 (from Dow) is uniformly mixed at room temperature in DI water.

Comparative Example 1A

The same mixture as shown in Example 1 is used except the 20 gms of functionalized organic specie (as mentioned above) containing 2-amino-6-methylbenzothiazole is replaced with 20 gms of Zinc phosphate based non-chromated corrosion inhibitor Halox Zplex 111 (from Halox).

Comparative Example 1B

The same mixture as shown in Example 1 is used except the 20 gms of functionalized organic specie containing 2-amino-6-methylbenzothiazole is replaced with 20 gms of strontium chromates.

The primer formulation from Example 1, and Comparative Examples 1a and 1b are sprayed onto FPL etched Al-2024 alloy. The primers are cured at 350 F for 1 hr. and bonded with FM 365 adhesive. Single lap shear test (ASTM D1002) specimens are exposed in a salt fog chamber (per ASTM B117) for 42 days.

Test Results showing the unexpected corrosion performance improvement seen with the use of functionalized organic specie containing 2-amino-6-methylbenzothiazole are shown in Table 1.

TABLE 1

| | % Corrosion after 42 days of salt fog exposure - ASTM B117 | % Retention of lap shear strength after 42 days salt fog exposure |
|---|---|---|
| Example 1 | 5% corrosion in single lap shear specimen. | 95% |
| Comparative Example 1a | 100% corrosion in single lap shear specimen. | 5% |
| Comparative Example 1b | 0% corrosion in single lap shear specimen. | 98% |

As seen in Table 1 the water based non-chromated primer with functionalized organic specie containing 2-amino-6-methylbenzothiazole shows corrosion performance comparable to chromates.

Example 2

Synthesis of Active Corrosion Inhibitors

The esters of carboxybenzotriazole are prepared as described in U.S. Pat. No. 6,495,712. Instead of phenol, other alcohol such as bis-phenol A is used.

The same mixture as shown in Example 1 is used except the 20 gms of functionalized organic specie containing 2-amino-6-methylbenzothiazole is replaced with a 20 gms of esters of carboxybenzotriazole.

Similar corrosion performance tests are performed as described above with respect to Example 1.

Example 3

The same mixture as shown in Example 1 is used except the 20 gms of functionalized organic specie containing 2-amino-6-methylbenzothiazole is replaced with 10 gms of functionalized organic specie containing 2-amino-6-methylbenzothiazole and 10 gms of esters of carboxybenzotriazole.

Similar corrosion performance tests are performed as described above with respect to Example 1. Example 3 shows corrosion performance comparable to chromates.

A summary of the results of Examples 1-3 and Comparative Examples 2a-2b are found in Table 2 below.

TABLE 2

| Primer Formulation | Is corrosion performance comparable to chromates | Example No. |
|---|---|---|
| A mixture containing 55 gms of ECN 1400, 25 gms of BAPP, 0.1 wt % Mergal K10N and 1 wt % of silane coupling agent Z-6040 in DI water. The different corrosion inhibitor packages as shown in each example are added to the primer formulation. | YES<br>YES<br>YES | Example 1<br>Example 2<br>Example 3 |

Example 4

A mixture containing 23 gms of Epirez 5003 (from Huntsmann), 43 gms of XU 3903 (bis A epoxy from Resolution Performance products), 5 gms of DER 669 (solid bis A epoxy from Dow), 10 gms of BAPP (from BASF), 4 gms of Toluene-2,4-bis(N,N'-dimethyl urea) (from CVC chemicals), functionalized organic specie containing 15 gms of esters of carboxybenzotriazole and 5 gms of 2-amino-6-methylbenzothiazole, 0.1 wt % Mergal K10N (from Troy Chemicals) and silane coupling agent Z-6040 (from Dow) is uniformly mixed at room temperature in DI water.

Comparative Example 4A

The same mixture as shown in Example 4 is used except the functionalized organic specie containing 15 gms of esters of carboxybenzotriazole and 5 gms of 2-amino-6-methylbenzothiazole is replaced with 20 gms of strontium chromates.

The primer formulation from Example 4 and Comparative Example 4a are sprayed onto FPL etched Al-2024 alloy. The primers are cured at 250° F. for 1 hr. The panels are scribed and exposed in salt fog chamber as per ASTM B117.

Test Results showing the unexpected corrosion performance improvement seen with the use of functionalized organic specie containing 15 gms of esters of carboxybenzotriazole and 5 gms of 2-amino-6-methylbenzothiazole are shown in Table 3.

Figure 3:
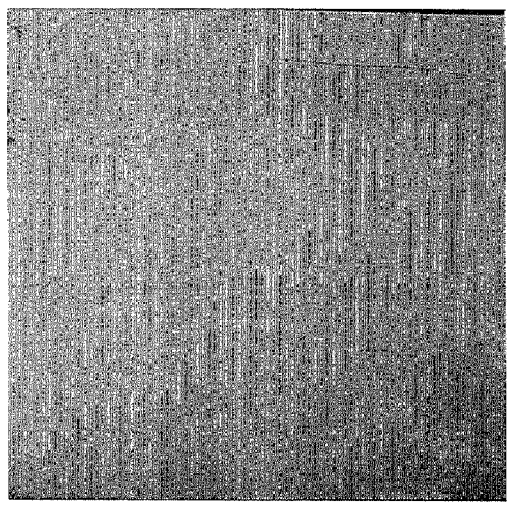
FIG. 3 illustrates corrosion performance of BR®6700-1 and BR®6800 primer with releasable (active) NC corrosion inhibitors. (A) BR®6800 with active corrosion inhibitors; (B) BR®6700-1 with active corrosion inhibitors.
Figure 3:
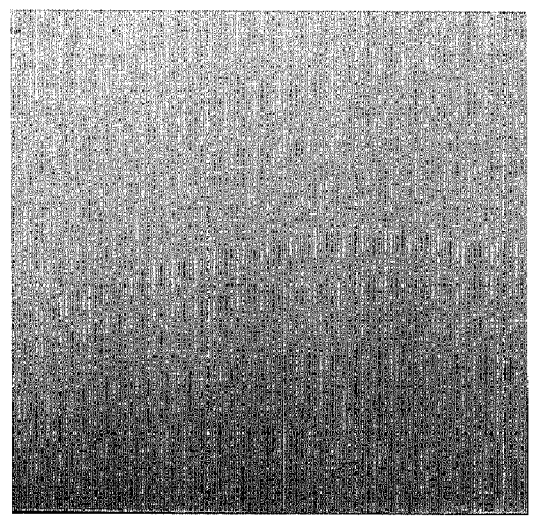
Figure 4:
FIG. 4a illustrates the corrosion performance of BR®6800 (NC primer with passive corrosion inhibitors) with FM 365 adhesive, after 1000 hrs. of salt fog exposure (100% corrosion).
FIG. 4b illustrates the corrosion performance of BR®6750 (chromated primer) with FM 365 adhesive, after 1000 hrs. of salt fog exposure (0% corrosion).
FIG. 4c illustrates the corrosion performance of BR®6700-1 (reformulated with releasable NC corrosion inhibitors) with FM 365 adhesive, after 1000 hrs. of salt fog exposure (5% corrosion).
FIG. 4d illustrates the corrosion performance of BR®6800 (reformulated with releasable NC corrosion inhibitors) with FM 365 adhesive, after 1000 hrs. of salt fog exposure (3% corrosion).
Figure 4:
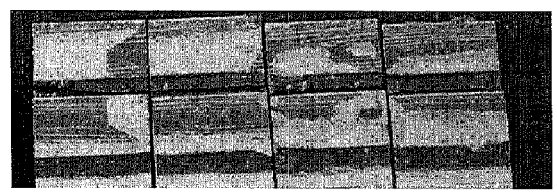
Figure 4:
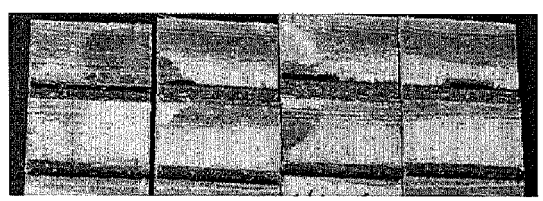
Figure 4:

As seen in FIG. 3 the water-based, non-chromated primer with functionalized organic specie containing 15 gms of esters of carboxybenzotriazole and 5 gms of 2-amino-6-methylbenzothiazole shows corrosion performance comparable to chromates.

Example 5

Synthesis of Active Corrosion Inhibitors

The functionalized clay particles with carboxybenzotriazole are prepared as described in technical paper "Bulky Diarylammonium Arenesulfonates as Selective Esterification Catalysts", K. Ishihara et. al., Journal of Americal chemical society, 2005, 127, pp 4168. Carboxybenzotriazole and hydroxyl functional clay particles are used instead of 4-phenylbutyric acid and cyclododecanol.

The same mixture as described in Example 4 is used except the functionalized organic specie containing 15 gms of esters of carboxybenzotriazole and 5 gms of 2-amino-6-methylbenzothiazole is replaced with the 20 gms of functionalized clay particles with carboxybenzotriazole as corrosion inhibitor.

TABLE 3

| Primer Formulation | Is corrosion performance comparable to chromates | Example No. |
|---|---|---|
| A mixture containing 23 gms of Epirez 5003, 43 gms of XU 3903, 5 gms of DER 669, 10 gms of BAPP, 4 gms of Toluene-2,4-bis (N,N'-dimethyl urea, 0.1 wt % Mergal K10N and silane coupling agent Z-6040 in DI water. The different corrosion inhibitor packages as shown in each example are added to the primer formulation. | YES<br>YES | Example 4<br>Example 5 |

Example 6

The same mixture as described in Example 4 is used except a 250 gm/liter of organic solvent blend is added to make a low VOC version of primer. The primer is cured at 250° F. for 1 hr. and bonded with FM 365 adhesive. Single lap shear test (ASTM D1002) specimens are exposed in salt fog chamber (per ASTM B117) for 42 days. The low VOC version of novel non-chromated primer shows comparable corrosion performance as chromated primer.

Example 7

A mixture containing 7 gms of Epirez 5003 (from Huntsmann), 4 gms of XU 3903 (from Resolution Performance products), 1 gm of DER 669 (from Dow), 2 gms of BAPP (from BASF), 1 gm of Toluene-2,4-bis(N,N'-dimethyl urea (from CVC chemicals), 15 gms of Aluminum Oxyhydroxide based releasable corrosion inhibitor nanoparticles containing thiolated 4-carboxy phenyl maleimide and 2-amino 6-methyl benzothiazole (from TDA Research Inc.), 0.1 wt % Mergal K10N (from Troy Chemicals) and silane coupling agent Z-6040 (from Dow) is uniformly mixed at room temperature in DI water.

Comparative Example 7A

A mixture containing 7 gms of Epirez 5003 (from Huntsmann), 4 gms of XU 3903 (from Resolution Performance products), 1 gm of DER 669 (from Dow), 0.5 gms of Dicy (from BASF), 1 gms of Ancamine 2014 (from Air products and chemicals), 0.5 gms of 2 MZ Azine (from Air products and chemicals), 15 gms of Aluminum Oxyhydroxide based releasable corrosion inhibitor nanoparticles containing thiolated 4-carboxy phenyl maleimide and 2-amino 6-methyl benzothiazole (from TDA research Inc.), 0.1 wt % Mergal K10N (from Troy chemicals) and silane coupling agent Z-6040 (from Dow) is uniformly mixed at room temperature in DI water.

The primer formulations from Example 7 and Comparative Example 7a are sprayed onto Al-2024 and titanium alloy with grit blast+Sol-gel surface pretreatment and cured at 250° F. for 1 hr. The panels are bonded using FM 73 adhesive and wedge test (ASTM D3762-98) coupons are fabricated. The specimens are exposed at 140° F. and 95% RH for 4 weeks. As seen from Table 4, the primer formulation with pH range 7-8 shows 95% or greater cohesive failure on both Al-2024-T3 and titanium alloy. Obtaining cohesive failure is a positive result and is an indication of breakage within the adhesive in comparison to breakage between the metal-Sol-gel interface.

This example illustrates that a primer formulation having a pH range of 7-8 is compatible with Sol-gel surface treatment.

TABLE 4

|  | pH range | % cohesive failure after 4 weeks exposure @ 140° F. and 95% RH | |
|---|---|---|---|
|  |  | Titanium alloy | Al-2024-T3 |
| Example 7 | 7-8 | 95% cohesive failure in wedge test specimen | 98% cohesive failure in wedge test specimen |
| Comparative Example 7a | 8-9.5 | 20% cohesive failure in wedge test specimen. | 30% cohesive failure in wedge test specimen. |

Example 8

A mixture containing 55 gms of ECN 1400 (from Huntsmann), 25 gms of BAPP (from BASF), 10 wt % Aluminum Oxyhydroxide based releasable corrosion inhibitor containing carboxybenzotriazole and 10 wt % Aluminum Oxyhydroxide based releasable corrosion inhibitor containing 2-Amino 6-Methylbenzothiazole, 0.1 wt % Mergal K10N (from Troy chemicals) and 1 wt % of silane coupling agent Z-6040 (from Dow) is uniformly mixed at room temperature in DI water. The primer forms a thick gel and cannot be sprayed onto metal substrate.

Higher concentration of Aluminum Oxyhydroxide based releasable corrosion inhibitor containing 2-Amino 6-Methyl-benzothiazole reacts with primer formulation to form a thick gel.

Example 5 illustrates an aspect where using about 5% corrosion inhibitor containing 2-amino 6-methybenzothiazole does not gel.

Various patent and/or scientific literature references have been referred to throughout this application. The disclosures of these publications in their entireties are hereby incorporated by reference as if written herein. In view of the above description and the examples, one of ordinary skill in the art will be able to practice the disclosure as claimed without undue experimentation.

It is known that those skilled in the art will recognize that variations can be made to the invention and the examples. The described methods, compositions and examples provided in this document do not limit the invention to those methods and the basic concept applies to all potential modifications.

What is claimed is:

1. A water-based non-chromated corrosion inhibiting primer formulation comprising:
    an epoxy resin;
    a curing agent with a cure temperature greater than 300° F.;
    an organosilane comprising a hydrolysable group; and
    at least one active corrosion inhibitor covalently anchored onto an organic or inorganic reactive specie, said at least one active corrosion inhibitor is a phenylmaleimide-based compound having the formula:

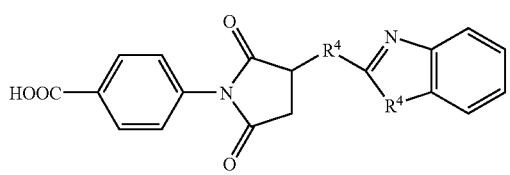

wherein each $R^4$ is independently chosen from: S, NH, and O; and

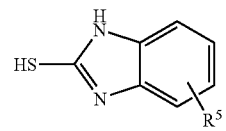

wherein the at least one corrosion inhibitor is releasable from the organic or inorganic reactive specie in response to a corrosive event.

2. The water-based non-chromated corrosion inhibiting primer formulation according to claim 1, wherein each $R^4$ is S.

3. The water-based non-chromated corrosion inhibiting primer formulation according to claim 1, wherein the organic or inorganic reactive specie is a particle of aluminum oxyhydroxide.

4. The water-based non-chromated corrosion inhibiting primer formulation according to claim 1, wherein the organic or inorganic reactive specie is a particle made of a clay chosen from bohemite, pseudobohemite, laponite, montmorrillonite, and combinations thereof.

5. A water-based non-chromated corrosion inhibiting primer formulation comprising:
    an epoxy resin;
    a curing agent;
    an organosilane comprising a hydrolysable group; and
    a first and a second active corrosion inhibitor covalently anchored onto an organic or inorganic reactive specie, said first active corrosion inhibitor is
    (a) an amino benzothiazole-based compound having the formula:

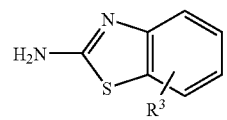

wherein $R^3$ is chosen from H, $C_nH_{2n+1}$, and $OC_nH_{2n+1}$; and said second active corrosion inhibitor is
(b) a benzotriazole-based compound having the formula:

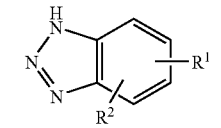

wherein $R^1$ is chosen from: H, $C_nH_{2n+1}$, COOH, and OH;
wherein $R^2$ is chosen from H and $C_nH^{2n+1}$;
wherein n is an integer; and
wherein the first and second active corrosion inhibitors are releasable from the organic or inorganic reactive specie in response to a corrosive event.

6. A water-based non-chromated corrosion inhibiting primer formulation comprising:
    an epoxy resin;
    a curing agent with a cure temperature greater than 300° F.;
    an organosilane comprising a hydrolysable group; and
    at least one active corrosion inhibitor covalently anchored onto an organic or inorganic reactive specie, said at least one active corrosion inhibitor is a benzotriazole-based compound having the formula:

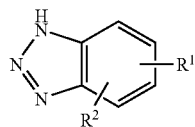

wherein $R^1$ is COOH and $R^2$ is H.

7. The water-based non-chromated corrosion inhibiting primer formulation according to claim 6, wherein the at least one active corrosion inhibitor is chosen from:

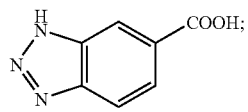 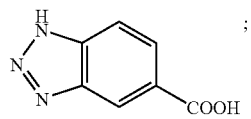

and combinations thereof.

8. A water-based non-chromated corrosion inhibiting primer formulation comprising:
  an epoxy resin;
  a curing agent;
  an organosilane comprising a hydrolysable group; and
  a first and a second active corrosion inhibitor covalently anchored onto an organic or inorganic reactive specie, said first active corrosion inhibitor is an amino benzothiazole-based compound having the formula:

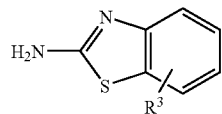

wherein $R^3$ is chosen from H, $C_nH_{2n+1}$; and $OC_nH_{2n+1}$, n is an integer; and said second active corrosion inhibitor is a phenylmaleimide-based compound having the formula:

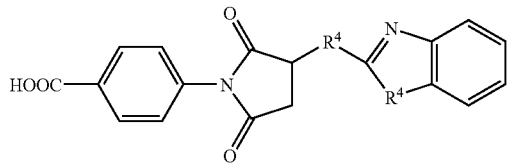

wherein each $R^4$ is independently chosen from: S, NH, and O; and wherein the first and second active corrosion inhibitors are releasable from the organic or inorganic reactive specie in response to a corrosive event.

* * * * *